(12) United States Patent
Kraus et al.

(10) Patent No.: US 11,905,764 B1
(45) Date of Patent: Feb. 20, 2024

(54) COUPLING WITH ENHANCED TORSIONAL, FATIGUE STRENGTH, AND WEAR RESISTANCE

(71) Applicant: IBEX Drilling Solutions, Inc., Midland, TX (US)

(72) Inventors: James Kraus, Kingwood, TX (US); Gary Lambert, Kingwood, TX (US); Mitch Houmand, The Woodlands, TX (US)

(73) Assignee: IBEX Drilling Solutions, Inc., Midland, TX (US)

( * ) Notice: Subject to any disclaimer, the term of this patent is extended or adjusted under 35 U.S.C. 154(b) by 0 days.

(21) Appl. No.: 17/547,126

(22) Filed: Dec. 9, 2021

Related U.S. Application Data

(60) Provisional application No. 63/123,468, filed on Dec. 9, 2020.

(51) Int. Cl.
*E21B 17/03* (2006.01)
*E21B 4/02* (2006.01)
*E21B 4/00* (2006.01)
*F16D 3/68* (2006.01)

(52) U.S. Cl.
CPC ............ *E21B 17/03* (2013.01); *E21B 4/003* (2013.01); *E21B 4/02* (2013.01); *F16D 3/68* (2013.01)

(58) Field of Classification Search
CPC . E21B 17/03; E21B 4/003; E21B 4/02; F16D 3/98
See application file for complete search history.

(56) References Cited

U.S. PATENT DOCUMENTS

| | | | |
|---|---|---|---|
| 344,611 A * | 6/1886 | Applegate | F16D 11/10 192/109 R |
| 1,272,124 A * | 7/1918 | Schluter | B60K 17/28 180/53.7 |
| 1,838,310 A | 12/1931 | Hubbel | |
| 2,025,824 A | 12/1935 | Ricefield | |
| 2,892,327 A * | 6/1959 | Kressin | F16D 3/18 464/157 |
| 2,973,633 A | 3/1961 | Hall | |
| 3,224,224 A | 12/1965 | Kudriavetz, Jr. | |
| 4,679,638 A | 7/1987 | Eppink | |
| 4,772,246 A | 9/1988 | Wenzel | |
| 4,904,228 A | 2/1990 | Frear et al. | |

(Continued)

*Primary Examiner* — Taras P Bemko
(74) *Attorney, Agent, or Firm* — Karen B. Tripp

(57) ABSTRACT

Coupling for transmission of torque, speed, and hydraulic thrust from a power section of a motor to a drive or output shaft. The coupling has a pair of mated hubs each with cantilevered teeth extending therefrom. The teeth are irregular in shape with an "S" curved driver side, a slanted unloaded surface, and a tooth base broader that the tooth top, which provide improved torsional and fatigue strength and wear resistance to the coupling. The coupling has utility in single and double articulation as a transmission in a mud motor for downhole directional drilling of subterranean formations. The coupling also has utility in other drilling operations employing motors requiring couplings of or for single or double articulation for minerals, geothermals, and HDD associated underground utilities. The invention further has utility with coiled tubing drilling and any power transmission equipment either with angular misalignment or direct drive.

11 Claims, 10 Drawing Sheets

(56) References Cited

U.S. PATENT DOCUMENTS

| | | | |
|---|---|---|---|
| 5,000,723 | A | 3/1991 | Livingstone |
| 5,007,880 | A | 4/1991 | Walker |
| 5,078,650 | A * | 1/1992 | Foote .................. E21B 17/05 |
| | | | 418/48 |
| 5,205,789 | A | 4/1993 | Falgout, Sr. |
| 5,377,771 | A | 1/1995 | Wenzel |
| 5,527,220 | A | 6/1996 | Geczy |
| 5,651,737 | A | 7/1997 | LeBlanc |
| 5,690,434 | A | 11/1997 | Beshoory et al. |
| 5,704,838 | A | 1/1998 | Teale |
| 6,203,435 | B1 | 3/2001 | Falgout, Sr. |
| 6,328,119 | B1 | 12/2001 | Gillis et al. |
| 6,361,444 | B1 | 3/2002 | Cheney et al. |
| 6,406,375 | B1 | 6/2002 | Herchenbach et al. |
| 6,569,020 | B1 | 5/2003 | Falgout, Sr. |
| 6,752,535 | B2 | 6/2004 | Krochak |
| 6,869,366 | B2 | 3/2005 | Delaney et al. |
| 6,949,025 | B1 | 9/2005 | Kraus et al. |
| 6,997,811 | B1 | 2/2006 | Falgout, Sr |
| 7,004,843 | B1 | 2/2006 | Kerstetter |
| 7,121,951 | B2 | 10/2006 | Chang |
| 7,186,182 | B2 | 3/2007 | Wenzel |
| 7,624,819 | B1 | 12/2009 | LeBlanc et al. |
| 7,712,550 | B2 | 5/2010 | Ide |
| 7,793,953 | B2 | 9/2010 | McDowell |
| 7,882,638 | B2 | 2/2011 | von Gynz-Rekowski |
| 7,901,137 | B1 | 3/2011 | Peterson |
| 8,033,917 | B2 | 10/2011 | Prill et al. |
| 8,033,920 | B1 | 10/2011 | Benson |
| 8,062,140 | B2 | 11/2011 | Wall |
| 8,088,015 | B2 | 1/2012 | Kwon et al. |
| 8,235,829 | B2 | 8/2012 | Kozlowski |
| 8,262,489 | B2 | 9/2012 | Valovick |
| 8,287,393 | B2 | 10/2012 | Dao |
| 8,342,970 | B2 | 1/2013 | Altimas et al. |
| 8,870,666 | B1 | 10/2014 | Leger et al. |
| 9,546,518 | B2 | 1/2017 | Leitko, Jr. et al. |
| 10,041,299 | B2 | 8/2018 | von Gynz-Rekowski et al. |
| 10,753,159 | B1 | 8/2020 | Ide |
| 10,808,846 | B1 * | 10/2020 | Hurst .................... F04B 1/0452 |
| 2003/0181245 | A1 | 9/2003 | Shaw |
| 2005/0051972 | A1 | 3/2005 | Wang |
| 2006/0171776 | A1 * | 8/2006 | Luft ........................ F16B 21/04 |
| | | | 403/267 |
| 2009/0258717 | A1 | 10/2009 | Higgins |
| 2009/0275415 | A1 | 11/2009 | Prill |
| 2010/0190561 | A1 | 7/2010 | Falgout, Jr |
| 2010/0215301 | A1 | 8/2010 | Wenzel |
| 2010/0313692 | A1 | 12/2010 | Wenzel |
| 2010/0326730 | A1 | 12/2010 | Prill et al. |
| 2011/0005839 | A1 | 1/2011 | Marchand et al. |
| 2011/0088952 | A1 | 4/2011 | Young et al. |
| 2012/0214604 | A1 | 8/2012 | Cassell |
| 2013/0012326 | A1 | 1/2013 | Terasaka |
| 2013/0072312 | A1 | 3/2013 | Wormsbaecher |
| 2013/0097867 | A1 | 4/2013 | Kozlowski |
| 2013/0288810 | A1 | 10/2013 | Foote et al. |
| 2014/0124268 | A1 | 5/2014 | Breaux |
| 2014/0224545 | A1 * | 8/2014 | Nicol-Seto ................ E21B 4/02 |
| | | | 175/107 |
| 2015/0014059 | A1 | 1/2015 | Perry |
| 2015/0176342 | A1 | 6/2015 | Ficken |
| 2016/0245022 | A1 | 8/2016 | Leitko, Jr. et al. |
| 2016/0273276 | A1 | 9/2016 | Baudoin |
| 2017/0045090 | A1 | 2/2017 | Kuhn |
| 2017/0145859 | A1 * | 5/2017 | Mariano ................ F01D 5/026 |
| 2017/0370420 | A1 | 12/2017 | Deen et al. |
| 2019/0162242 | A1 | 5/2019 | St. Pierre et al. |
| 2020/0124108 | A1 | 4/2020 | Goff et al. |
| 2020/0124109 | A1 | 4/2020 | Goff et al. |

* cited by examiner

COUPLING WITH ENHANCED TORSIONAL, FATIGUE STRENGTH, AND WEAR RESISTANCE

RELATED APPLICATION

This patent application claims priority from U.S. Provisional Patent Application No. 63/123,468, filed Dec. 9, 2020, the contents of which are incorporated herein by reference.

BACKGROUND

1. Field

This invention relates to apparatuses for use as couplings such as single or double universal joints or U-joints, Cardan joints, knuckle joints, constant velocity joints, jaw clutches, articulated joints and the like, and particularly to joints used as a coupling in a mud motor, with single or double articulation. More particularly, the invention relates to an apparatus for transferring power and axial force in the transmission section of a downhole mud motor, between the power section and the bearing assembly section above the drill bit, for use in directional and horizontal drilling of subterranean boreholes for applications in the oil and gas field, in mining for coal and minerals, in geothermal drilling, and in civil construction operations for underground pipelines, cables and conduits, including trenchless horizontal directional drilling such as associated with underground utility lines. The invention can also have further application in coiled tubing drilling.

2. Description of Relevant Art

As subterranean hydrocarbon reservoirs become more difficult to reach, wellbore drilling operations become more complex in both vertical and horizontal directions, and the need to precisely locate a downhole drilling assembly within desired subterranean formations increases. Accurate steering of the drilling assembly is necessary either to avoid particular formations or to intersect formations of interest.

The most common deviation tools for directional drilling are steerable motor assemblies, also called positive-displacement motors or mud motors, and rotary steerable tools, which may also be (but not necessarily be) powered by a mud motor. A typical downhole mud motor includes a motor suspended near the lower end of a string of drill pipe supported from a well surface location, such as a land-based or sea-based drilling rig. The motor includes a rotatable drive shaft that is directly or indirectly coupled to a rotary drill bit. The motor operates by circulating drilling fluid or "mud" through the drill pipe and into the motor, which generates torque and speed that causes the drive shaft to rotate and thereby correspondingly rotate the drill bit.

Steering a drilling assembly for directional drilling with a mud motor includes changing the tool face direction of the drill bit coupled to the end of the drilling assembly. This can result in high axial, radial, and torsional loads transmitted across an articulated drive shaft joint or coupling that must accommodate the force loads.

The coupling, which can be single or double, is the transmission unit of the mud motor. The coupling connects the drive shaft and the driven part—for example, the rotor shaft (from the power section) and the bearing assembly—for the purpose of transmitting torque and speed or power. The coupling also provides mechanical flexibility for misalignment of the shafts, thereby preventing uneven wear, vibration, and other mechanical troubles due to misalignment.

Thus, the main roles of a coupling include: (1) connecting input drive shafts of rotors (the power section of the mud motor) with driven shafts of motors (the bearing assemblies and the like) to transmit power; (2) providing tolerance for misalignment or a bend between the drive shaft and the driven shaft; (3) absorbing equipment shock impacts and vibration; (4) improving equipment performance; and (5) transmitting axial load (from hydraulic thrust). A common coupling used in mud motors is a universal joint.

Because couplings in mud motors are subjected to high torques and hostile environments, attention and efforts are given to reduce coupling fatigue and wear. Seals have been commonly used to protect the internal surfaces of couplings, and particularly universal joints, from corrosive or erosive mud and to reduce the coefficient of friction between the coupling surfaces and high velocity drilling fluid. Commonly a seal structure is disposed between the coupling hub member and a female coupling member. One drawback of this design is that the seal structure reduces the torque transfer capacity of the joint. Generally, torque transfer capacity depends on the radius of a rotating member. Because the radius of the coupling hub member is reduced to accommodate the seal structure, the coupling hub member's torque transfer capacity is also reduced. Further, such seals break down over time from wear and the hostile conditions of the downhole environment. Another drawback of some prior art universal joints has been an imbalance of the joint caused by internal constriction. When lubricant is added to the universal joint to reduce friction between the members during articulation, and the grease is placed on one side of the joint, an axial imbalance during rotation can occur.

These example drawbacks, compounded by the high torques and hostile environments to which joints and other couplings are subjected downhole, contribute to mud motor transmission failures while drilling. A downhole mud motor failure due to a transmission failure is very costly. Whenever there is a transmission failure, all drilling operations must cease. Before drilling operations can resume, the entire drilling assembly, including the mud motor, must be pulled out of the hole and another drilling assembly with a new or replacement mud motor must be returned to the bottom of the hole. Drilling time lost can typically extend over a period of about 24 hours—a day of drilling and rig time—at a cost of thousands of dollars. Some rig rates approach as much as $80,000.00 per day, or more.

A need exists for joints and couplings with greater torsional and fatigue strength and wear resistance, that can resist transmission fractures, fatigue, separation, wear, seal breakdown and elastomeric boot ruptures (when used), altogether or for longer periods of use.

SUMMARY

The present invention provides a coupling apparatus, or coupling, that meets these needs for providing a joint with greater torsional and fatigue strength and wear resistance, while transmitting torque, speed, and hydraulic thrust from a power section of a motor to a drive shaft or output shaft. The coupling of the invention comprises a pair of mated hubs with one to four teeth protruding cantilevered from the top of each hub. Each of the teeth has a broader or wider base adjacent the top of the hub than at the top of the teeth, thereby increasing or enhancing the torsional strength and shock (fatigue) resistance provided by the coupling.

Each of the teeth are irregular in shape but substantially similar one to the other for mating. Each of the teeth have an "S" curved side at the driver or driven side of the coupling and a slanted or rake back side at the unloaded surface of the coupling, such that the maximum stress on the coupling during use occurs at or near the top of the hub at the base of the teeth, giving the coupling improved torsional strength, fatigue strength and wear resistance over couplings with regular shaped teeth.

BRIEF DESCRIPTION OF THE DRAWINGS

In the drawings a more detailed and complete appreciation of the present invention and various advantages can be realized by reference to the detailed description that will accompany the drawings in which.

DETAILED DESCRIPTION

The present invention provides a coupling with improved torsional and fatigue strength and wear resistance, whose advantages are particularly appreciated when the coupling is used as a transmission in a mud motor in drilling a borehole for the recovery of hydrocarbons, or in other subterranean mining or drilling operations.

Figure 1:
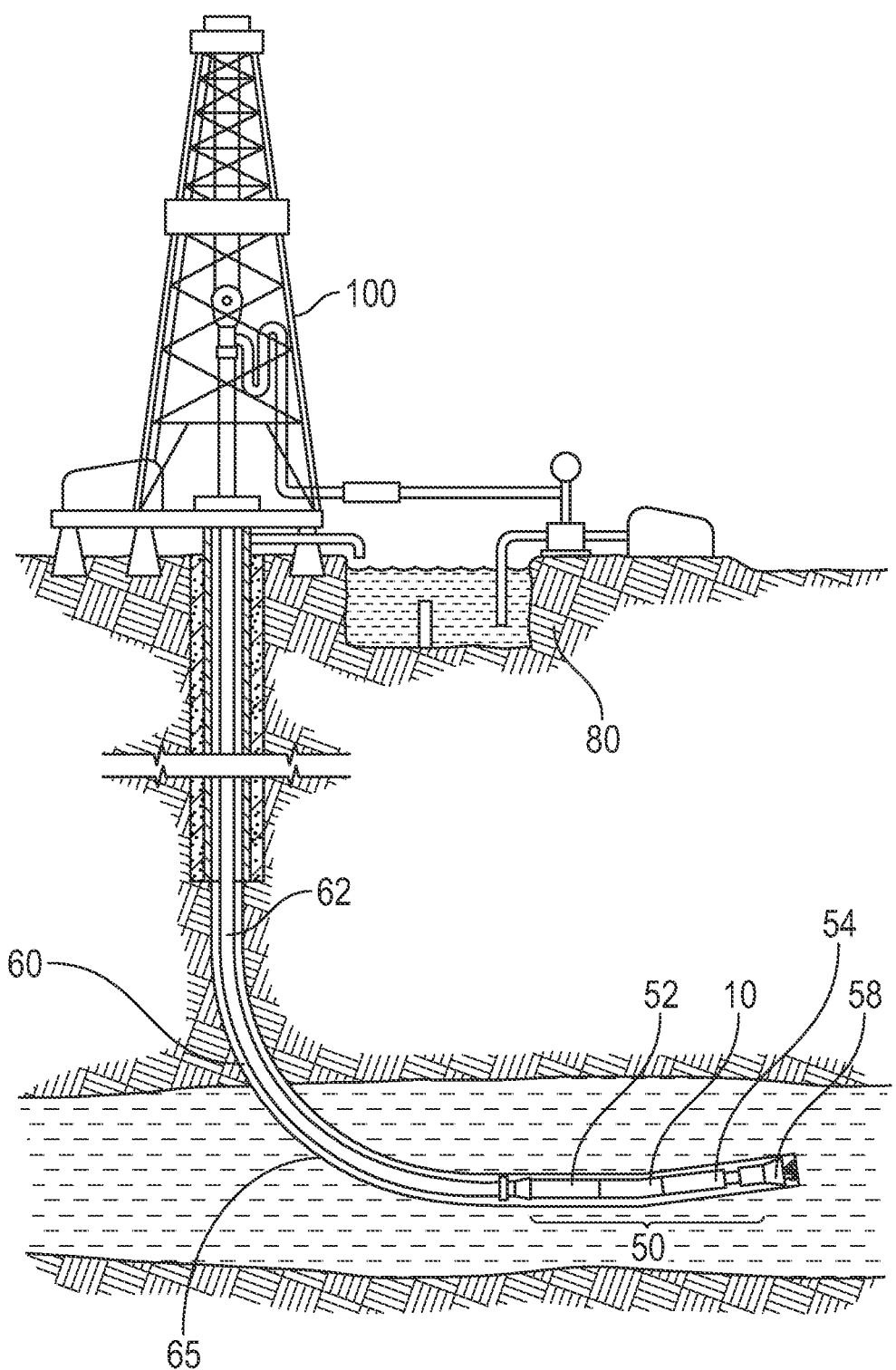
FIG. 1 is a schematic depiction of an example subterranean well system employing one embodiment of the coupling of the present invention.
Figure 2:
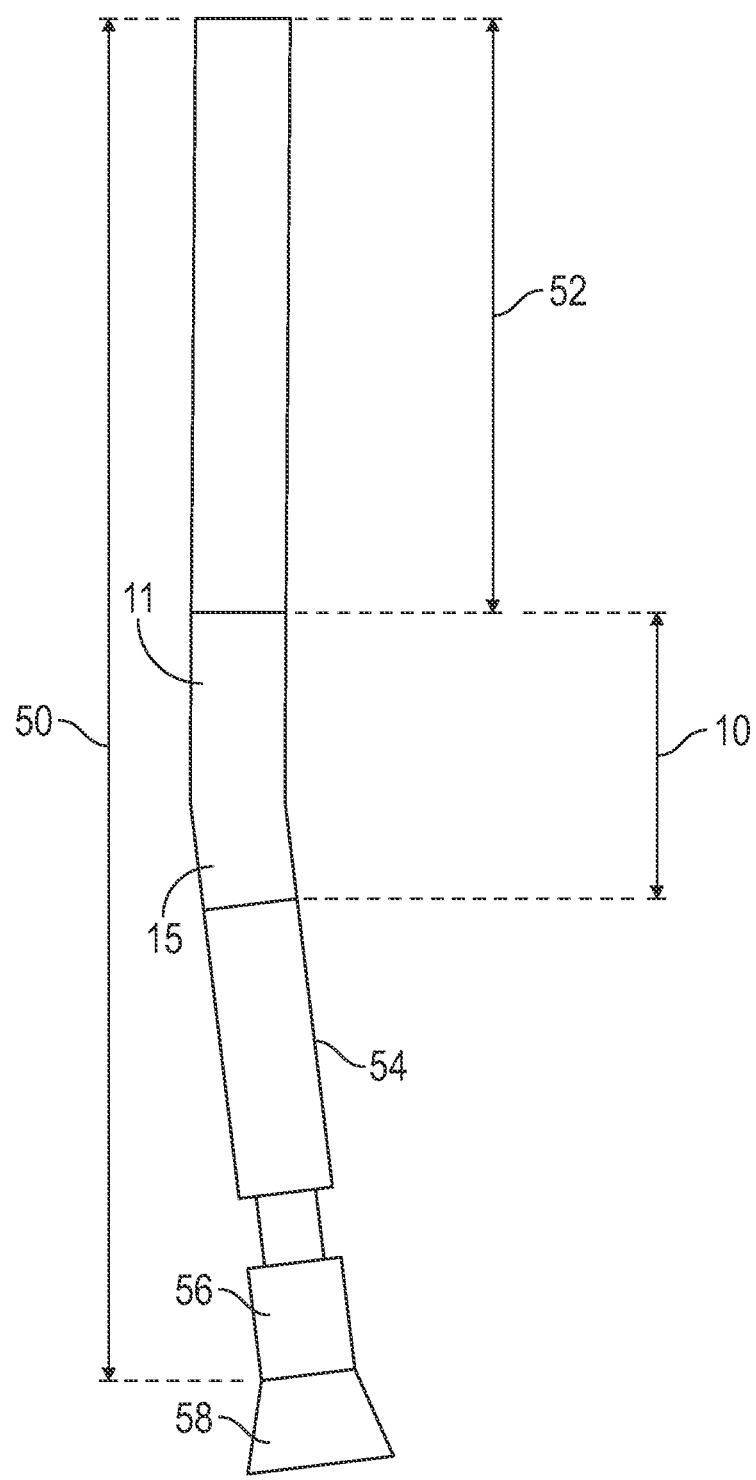
FIG. 2 is a schematic depiction of the basic elements of a mud motor employing one embodiment of the coupling of the present invention, for use in the well system shown in FIG. 1.

Referring to the figures, FIG. 1 illustrates such a use of the coupling 10 of the invention. FIGS. 1 and 2 show a mud motor 50 in position near the bottom of a directional wellbore (or borehole) 60 during a drilling operation for hydrocarbons. Although a drilling rig 100 is shown on land, the principles of the invention apply the same to a drilling rig offshore. Directional wellbore 60 is being drilled in the subterranean formation 80, and is shown being curved or having been curved through a section 65. Eventually, this curve may continue such that the wellbore 60 becomes a horizontal wellbore. The drill string (including drill pipe, drill collars, and sensor packages) 62 is in place. The curved section 65 is drilled with the mud motor 50, which may also be called a motor assembly.

Even though FIG. 1 depicts a directional wellbore 60 being drilled, the mud motor 50 is equally well suited for use in a vertical wellbore or in a horizontal wellbore. Directional terms used herein such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the bottom or toe of the well, unless specifically stated otherwise.

Mud motor 50 is run on drill string 62. The power section 52 of the mud motor 50 preferably has the well-known Moineau-type design where a helical rotor rotates in a lobed stator in response to drilling mud being pumped through it under pressure. The lower end of the rotor and power section 52 is coupled by coupling 10 of the invention to bearing assembly 54. The drill bit 58 is attached to the lower end (or drive shaft bottom end) 56 of the bearing assembly 54 of mud motor 50.

As used herein, the term "couple" and any variation thereof refers to either an indirect or a direct connection between two structural elements. Thus, if a first device couples or is coupled to a second device, that connection may be through a direct connection or through an indirect mechanical connection via other devices and/or connections.

Coupling 10 is the transmission for the mud motor 50. Coupling 10 transfers torque and speed from the power section 52 to the bearing assembly 54 and on to the lower end 56 (or drive shaft bottom end) of mud motor 50 and to the drill bit 58. Coupling 10 also transmits hydraulic thrust from the power section 52 to the bearing assembly 54 of mud motor 50. Coupling 10 further transfers "eccentric" motion from the power section 52 (particularly the rotor of the power section 52), to "concentric" motion of the bearing assembly 54 drive shaft 56. In use with a mud motor 50, coupling 10 usually rotates clockwise. However, coupling 10 is equally able to rotate counterclockwise (when the tooth curved "S" pattern is on the opposite side of the tooth).

Advantages of coupling 10 over traditional and prior art transmissions and couplings are that coupling 10 of the invention has increased torsional and fatigue strength and wear resistance so that transmission failures causing mud motor failures downhole are substantially reduced, even with increasing demands for faster directional drilling. These advantages of coupling 10 are not limited to downhole operations, or to directional drilling for hydrocarbons. The advantages are especially appreciated in such operations, however, because of the costliness of failure in these operations and the hostile environment and conditions historically leading to such failures. The advantages of coupling 10 are achieved through the unique design of the coupling 10, as explained below.

Figure 3:
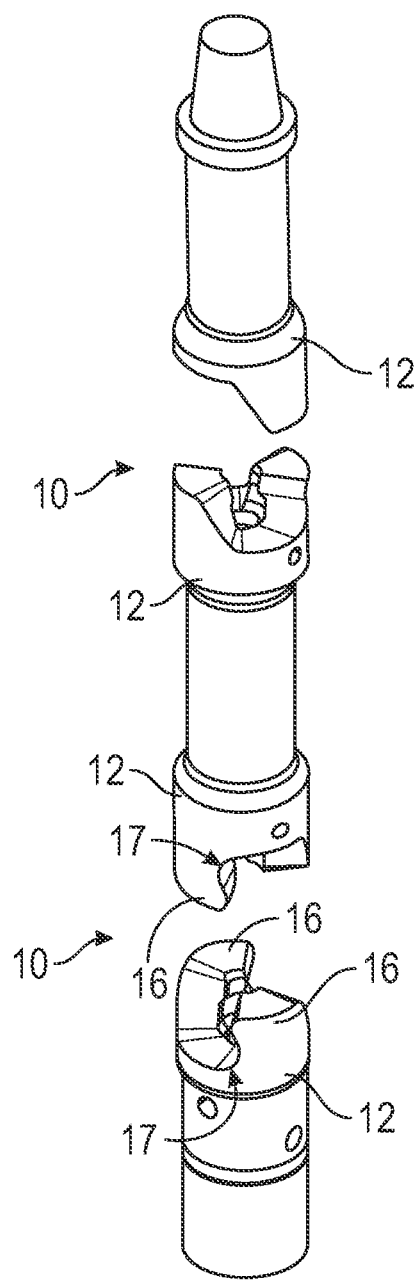
FIG. 3 is an exploded view of an assembly of a mud motor transmission that includes a double coupling embodiment of the present invention.
Figure 4:
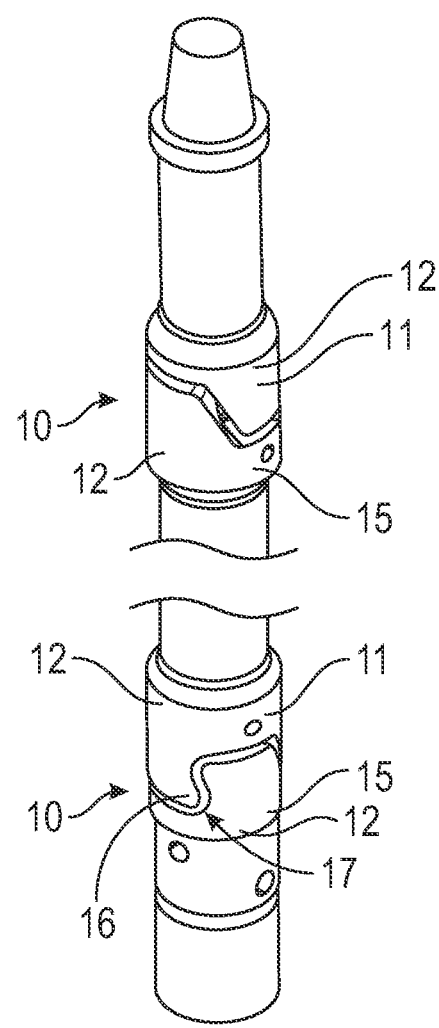
FIG. 4 is an assembled, non-exploded view, of the mud motor transmission assembly of FIG. 3, showing the hubs comprising the coupling mated but the teeth not yet engaged for use.
Figure 5:
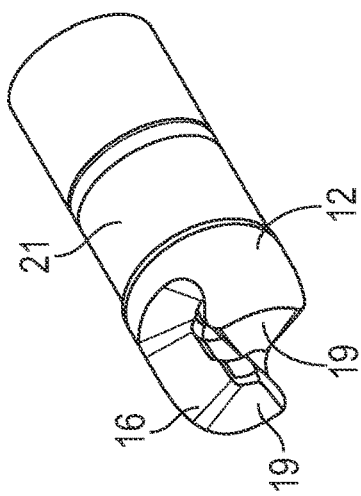
FIG. 5 is a side perspective view of one hub (of a pair) for comprising one embodiment of the coupling of the present invention.

Referring to FIG. 3, coupling 10 of the invention is shown assembled on a shaft with another coupling 10 as they may be engaged and used in one embodiment of the invention. Each coupling 10 has two hubs 12 (or a pair of hubs 12) which can be identical and should be at least sufficiently similar that they can "mate" or come together, as shown in FIG. 4 (and in FIG. 29 discussed below). When the hubs 12 are "mated" as shown in FIG. 4 to comprise coupling 10, the hub 12 closer to or adjacent the power section 52 of the mud motor 50 is called the "driver" member 11 of the coupling 10 and the hub 12 closer to or adjacent to the bearing assembly 54 section of the mud motor 50 is called the "driven" member 15 of the coupling 10.

Figure 26:
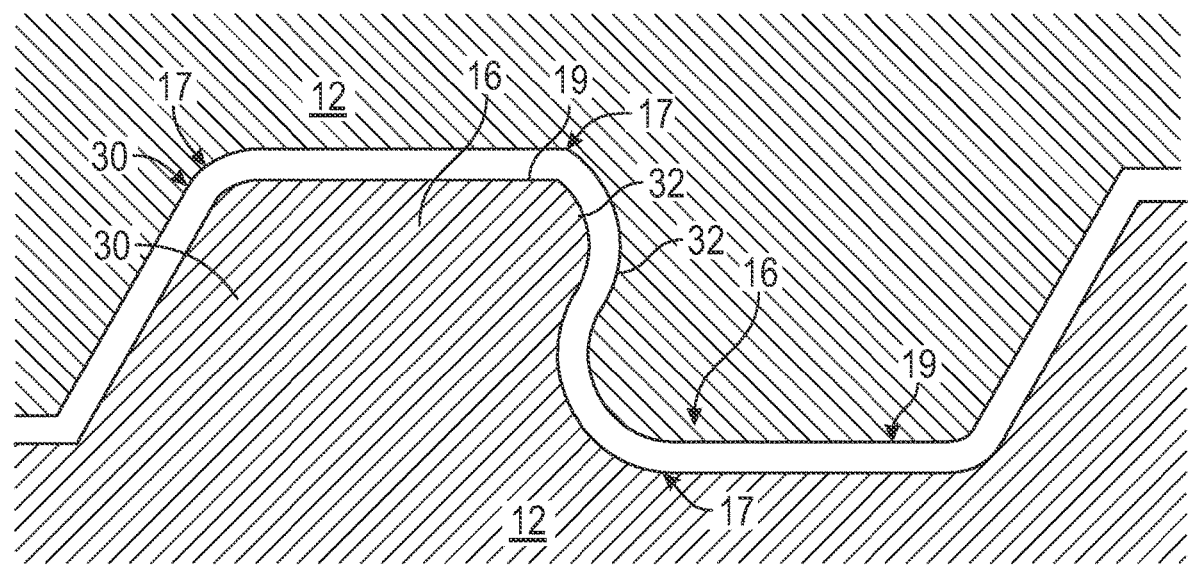
FIG. 26 is a two dimensional profile of a tooth from each hub of one embodiment of a coupling of the invention, showing the manner of mating of the teeth in comprising the coupling.
Figure 27:
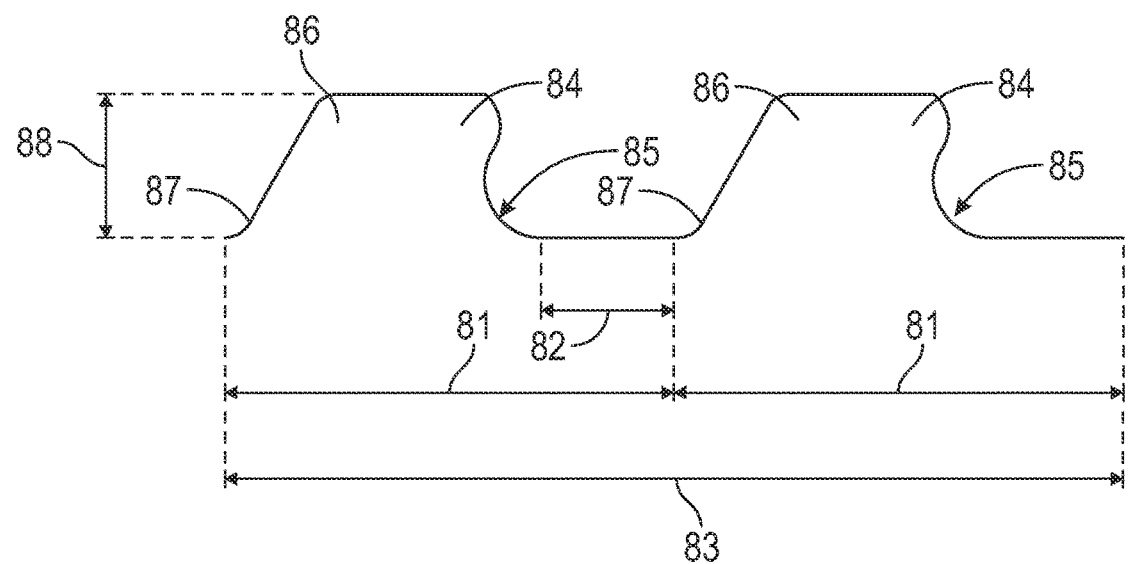
FIG. 27 is a two dimensional profile of both teeth on one of the hubs of the embodiment of the coupling of the invention of FIG. 26. Although not shown in FIG. 26, the hubs of that embodiment each have two teeth.

Each hub 12 preferably has about one, two, three, or four teeth 16, which are used to transmit power. Each hub 12 in a hub pair should preferably have the same respective number of teeth 16 for the best mating of the two hubs 12. The teeth 16 are cantilevered, supported only at the hub 12 from which they extend or protrude as can be seen in FIGS. 3-9. The teeth 16 are irregular in shape, as shown in FIGS. 3-9 and especially in FIGS. 14-17 and in FIGS. 26 and 27, but the irregularities are the same or at least substantially similar from one tooth to the other so that the teeth 16 are generally or at least preferably fungible one with another in mating the two hubs 12 together as shown in FIGS. 4, 26 and 27. Preferably, the teeth 16 are formed or cut out of hub 12 or the cylinder (or other shaped base or block) comprising or used to comprise hub 12, rather than attached to hub 12, although the teeth 16 could in some embodiments or for some uses be cut separately and welded to hub 12.

The base 17 of each of the teeth 16, that is, the point or location 17 at which the teeth 16 extend or protrude from the hub 12, is wider, broader, has a greater diameter or radius, and/or covers more surface area than the top 19 of each of the teeth 16, as shown in FIGS. 3-9, 14-17, and 26 and 27. This characteristic of the teeth 16 enhances the strength of the teeth 16 over prior art teeth which are regular in shape, while still allowing for mating of the teeth 16 for mating of the hubs 12 as shown in FIGS. 4 and 26.

Moreover, base 17, having wider, broader, greater diameter or radius of the teeth 16 at the hub 12, than regular, prior art teeth, that is, base 17 having a larger cross-sectional area with respect to hub 12 than seen with prior art couplings, enables coupling 10 of the invention to have substantially increased or enhanced torsional strength and shock resistance than prior art couplings and knuckle joints used in traditional transmissions of motors.

Figure 6:
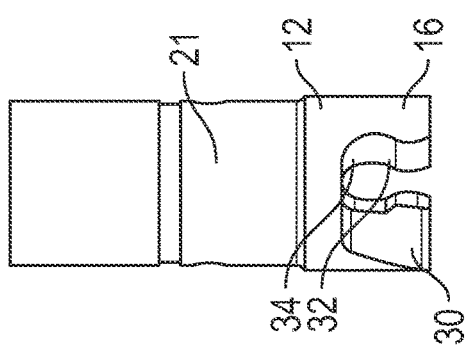
FIG. 6 is a side view of the hub of FIG. 5.
Figure 7:
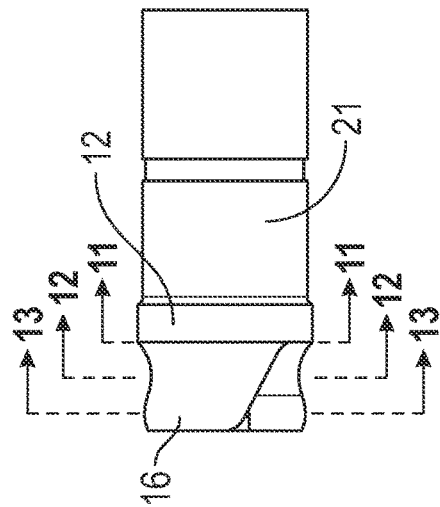
FIG. 7 is another side perspective view of the hub of FIG. 5.
Figure 8:
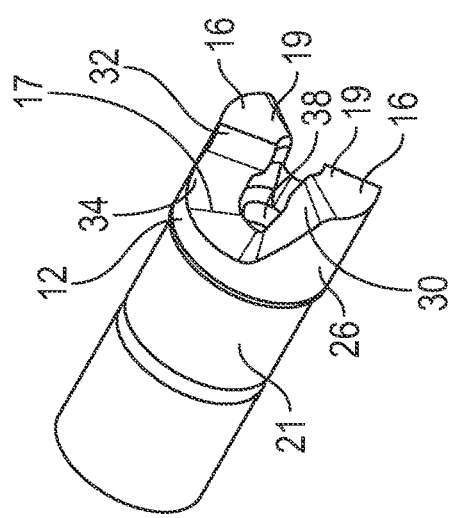
FIG. 8 is a top side perspective view of the hub of FIG. 5.
Figure 9:
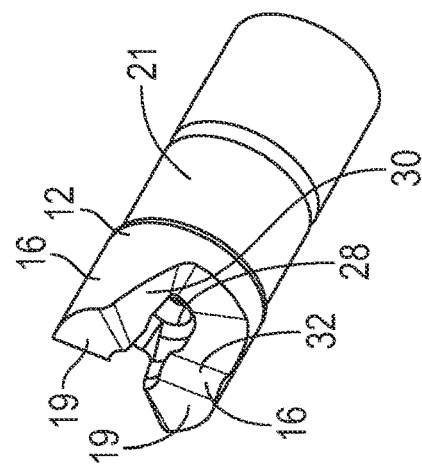
FIG. 9 is another side view of the hub of FIG. 5.
Figure 10:
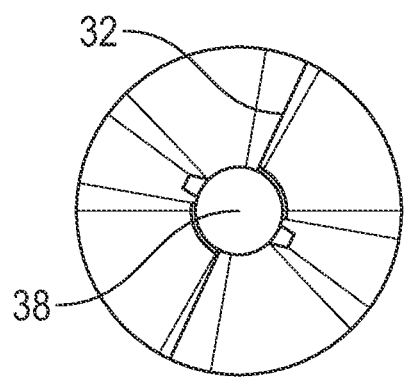
FIG. 10 is a top view of the hub of FIG. 5.
Figure 11:
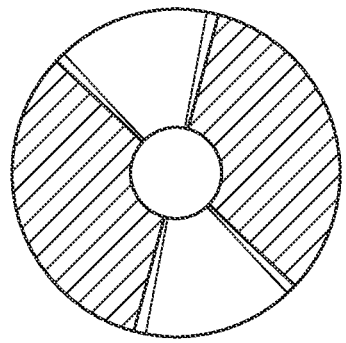
FIG. 11 is cross-sectional top view of the hub of FIG. 9, cut across the tooth base or the location where the teeth extend or protrude from the hub.
Figure 12:
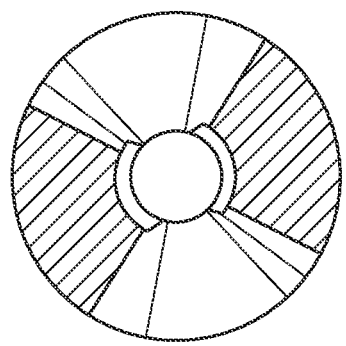
FIG. 12 is another cross-sectional top view of the hub of FIG. 9, cut across the middle of the teeth, along the horizontal plane of the teeth.
Figure 13:
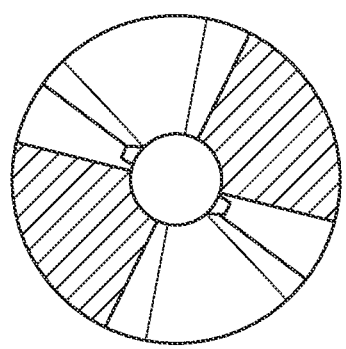
FIG. 13 is another cross-sectional top view of the hub of FIG. 9, cut across the teeth near their top, along the horizontal plane of the teeth.
Figure 14:
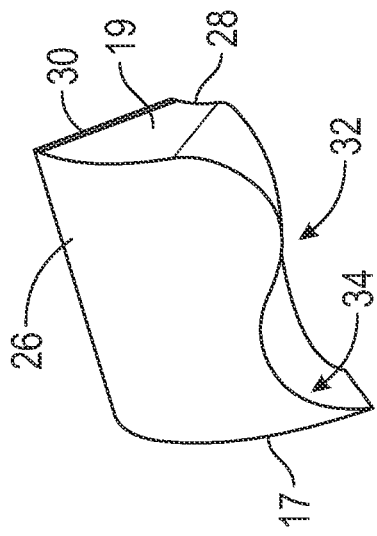
FIG. 14 is a bottom side perspective view of one tooth of a hub of one embodiment of the coupling of the invention, removed from the hub.
Figure 15:
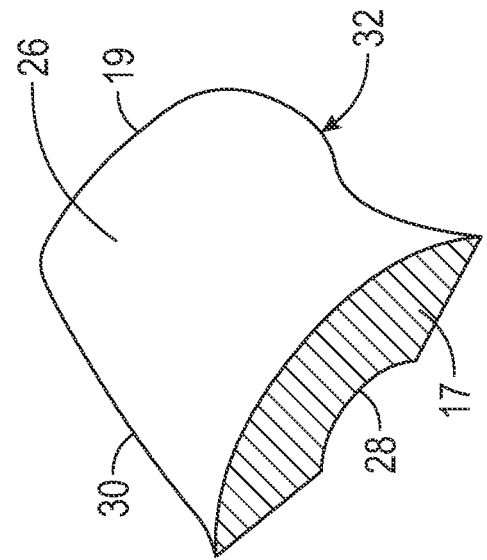
FIG. 15 is side perspective view of the tooth of FIG. 14, showing the curved side of the tooth, which is the driver/driven surface.
Figure 16:
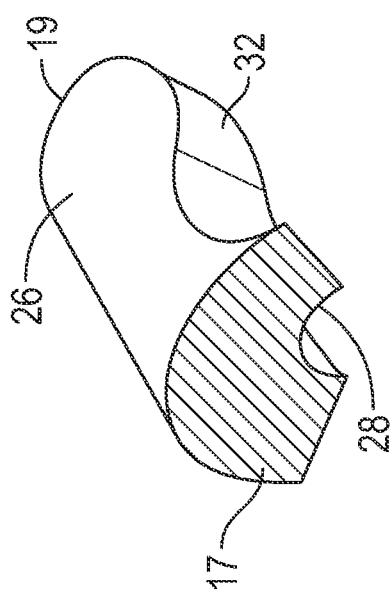
FIG. 16 is a top and external side perspective view of the tooth of FIG. 14.
Figure 17:
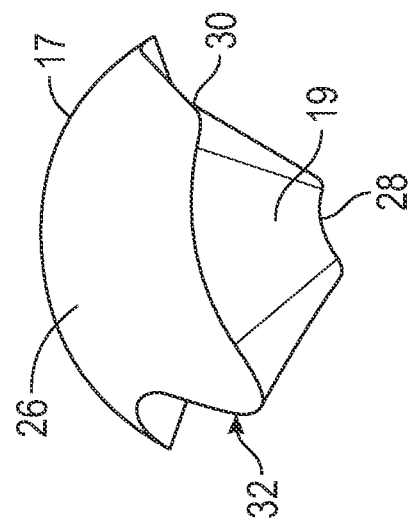
FIG. 17 is a bottom and external side perspective view of the tooth of FIG. 14.
Figure 20:
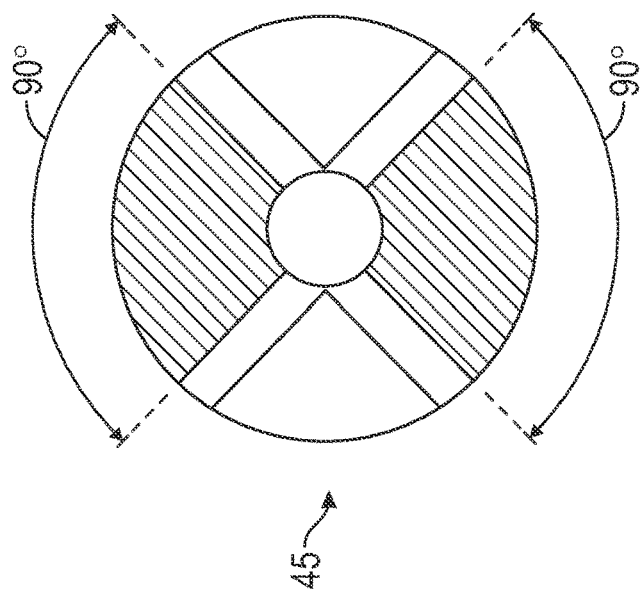
FIG. 20 is a cross sectional view of the top of the hub of the prior art knuckle coupling of FIG. 18, cut across the tooth base or the location where the teeth extend or protrude from the hub.
Figure 19:
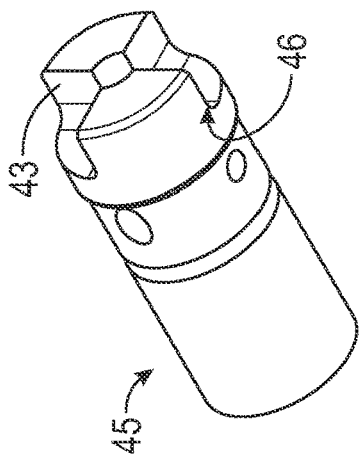
FIG. 19 is a side perspective view of the hub of the prior art knuckle coupling of FIG. 18.
Figure 21:
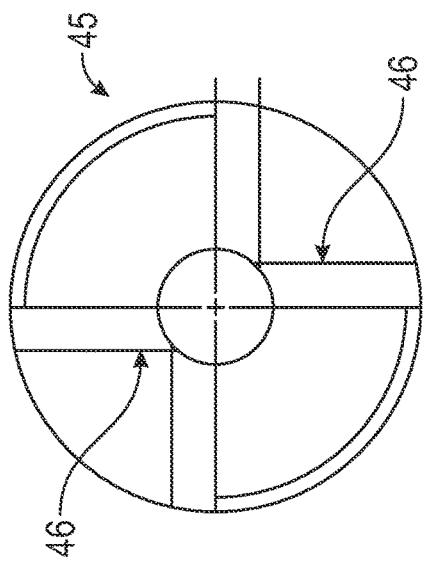
FIG. 21 is a top view of the hub of the prior art knuckle coupling of FIG. 18.
Figure 18:
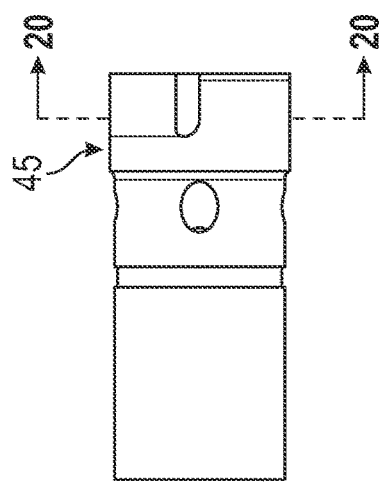
FIG. 18 is a side view of a hub of a prior art knuckle coupling.
Figure 22:
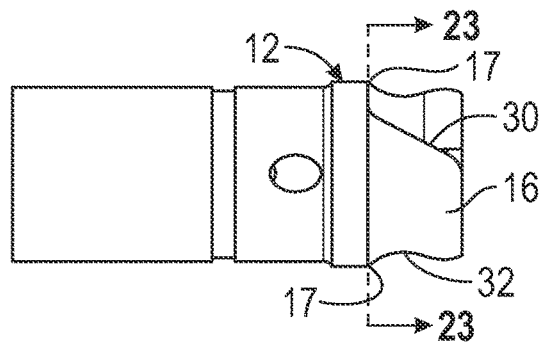
FIG. 22 is a side view of an embodiment of a hub of a coupling of one embodiment of the invention adapted or configured for assembly on a shaft secured with pins, like the assembly for which the prior art knuckle coupling of FIG. 18 is adapted or configured.
Figure 23:
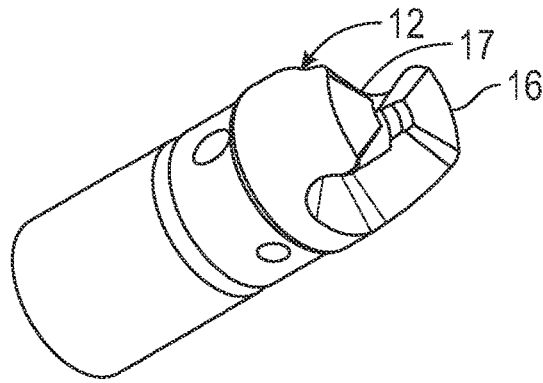
FIG. 23 is a top side perspective view of the hub of the coupling of one embodiment of the invention of FIG. 22.
Figure 24:
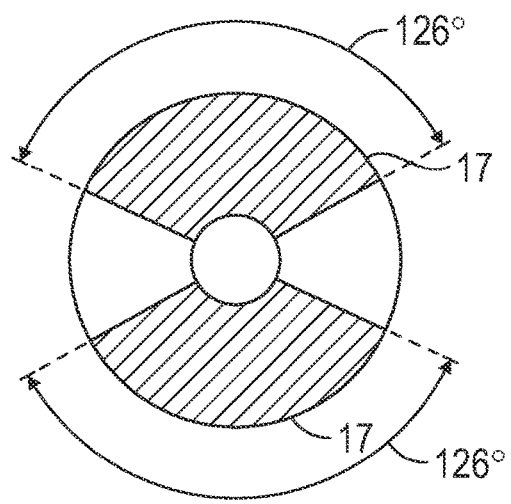
FIG. 24 is a cross sectional view of the hub of the coupling of the embodiment of the invention of FIG. 22, cut across the tooth base or the location where the teeth extend or protrude from the hub.
Figure 25:
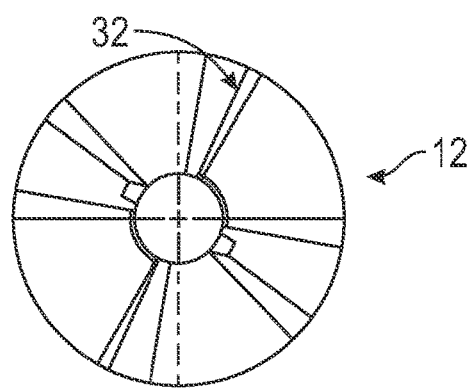
FIG. 25 is a top view of the hub of the coupling of the embodiment of the invention of FIG. 22.

The maximum stress on coupling 10 occurs in use at the base of the teeth 16 very near hub 12 and base 17, shown as 34 in FIGS. 6 and 15. The resultant force created by the torque input occurs at the curved side 32 in FIGS. 14 and 15. This is also the area of the teeth which have a proportionately larger radius than regularly shaped teeth in prior art couplings. The substantially larger cross-sectional area of the teeth at base 17 with respect to hub 12 thus contributes substantially to coupling 10's ability to withstand these stresses over longer time without fatigue than traditionally shaped couplings. Also, coupling 10, with its pair of "mated" hubs 12 as shown in FIG. 4, has a sliding theoretical "line to line" contact, which further reduces contact stresses on the driver/driven surfaces, rather than the "point to point" contact stresses of traditional couplings that wear out faster.

FIGS. 18-21 and FIGS. 22-25 (as well as FIGS. 6, 14, and 15 as discussed above), respectively compare the maximum stress locations and cross sectional areas of the hubs at the base of the teeth (where the teeth protrude from the respective hubs), for a typical prior art knuckle style coupling 45 (in FIGS. 18-21) and one embodiment of the coupling 10 of the invention (in FIGS. 22-25 and FIGS. 6, 14, and 15). For the hub of the embodiment of the coupling 10 of the invention, the cross-sectional area at the base 17 of the teeth 16 where the teeth 16 join or extend from the hub 12 can be 126 degrees. The cross-sectional area at the corresponding base of the teeth of the hub of the prior art knuckle style coupling 45 is only 90 degrees. The maximum stress point 43 for the hub of the prior art coupling 45 reflects a smaller radius 46 than the maximum stress location on coupling 10 of the invention, shown at location 34 in FIGS. 6 and 15. This feature of coupling 10 (having a larger stress point location in the same size hubs) would thus in turn enable the coupling of the invention to do the same work as prior art couplings even if made with a smaller size than the prior art couplings, which can be advantageous when a smaller size is beneficial or needed.

The irregularity of the shape of the teeth 16 is deliberate as demonstrated in the Figures. Each of the teeth 16, that is, each tooth 16, has a slanted side 30 and a curved side 32. The top 19 of the teeth 16 is flat and in the embodiment shown, horizontal and parallel to the base 17 of the teeth 16 where the teeth join or extend from the hub 12. In other embodiments, the top of the teeth could be rounded or even beveled or another desired shape. The slanted side 30 has an angle, a back "rake" or inclined type angle, of about 10 degrees to about 60 degrees from base 17, as shown in FIGS. 5, 8, 9, 15, 17, 26 and 27. The curved side 32 has somewhat of a general "S" curve shape, as shown in FIGS. 7, 14, 15, 26 and 27. The slanted side 30 tapers from the base 17 and with the "S" curve shape of the curved side 32 results in the teeth 16 have a greater base 17 surface area that the surface area of the top 19 of the teeth 16.

The geometry of the teeth is illustrated in FIGS. 26 and 27. Generally, the dimensions for the size and placement of the teeth is a function of the outside diameter of the hub. The length of the teeth (that is, the height of the teeth above the top of the hub) is selected to be in the range of about 0.2 times the outside diameter of the hub to about the same value as the outside diameter of the hub) and the core (or bore) of the hub (if the hub has a core, depending on the type of assembly) has an internal diameter in the range of about 0.2 times the outside diameter of the hub to about 0.6 times the outside diameter of the hub. Thus, while hubs of the invention can be any size and typically will vary in size from less than an inch to more than 36 inches, an example hub with an outside diameter of 5 inches would have teeth from 1 to 5 inches long and a core with an internal diameter of 1 to 3 inches. In the embodiment of the coupling of the invention shown in FIGS. 26 and 27, the teeth 16 on both hubs 12 are identical (although they do not have to be). In the non-limiting example shown, each hub 12 is a cylindrical hub, with a diameter of 5 inches and a central core 38 having a diameter of 1.75 inches. Each hub 12 has two teeth 16, each 2.50 inches in length (or height extending above the hub at the tooth base 17). The arrangement of the teeth 16 on the hub 12 is calculated by the following formula: ½ (π *diameter)=7.854 inches, which is the measurement of the hub circumference of one tooth 16 in this example where the two-teeth hub outside diameter is 5 inches. FIG. 26 shows one tooth 16 on one hub 12 as it "mates" with one tooth 16 on the other hub 12 comprising the coupling. FIG. 27 shows the two teeth 16 on one hub of this example, indicating the perimeter space of each tooth 81 and the total hub circumference 83 of 15.708 inches. Although "inches" are used herein, other units could alternatively be used, such as millimeters, or centimeters, or even simply "units of measurement." These measurements in turn relate to the tip radius or the convex top radius 84, and the base radius or the concave base radius 85 of the teeth, which affect the amount of angular deflection that can be obtained with the coupling when the hub pairs are mated. In mating, the top 19 of the teeth 16 on one hub are mated (or matched) with the base 17 of the teeth on the mating hub as shown in FIG. 26 and also in FIGS. 3 and 28. Thus the tip radius 84 and the base radius 85 should not have the same value when angular deflection of the coupling is desired. In this example, the base radius 85 (1.00 inch) minus the tip radius 84 (0.750 inch) equals 0.250 inch, which is a radius difference allowing for angular deflection. In other examples and/or alternative embodiments of the coupling of the invention, the tip radius and the base radius may have other radius differences, thus also allowing for angular deflection, or the tip radius and the base radius instead may be the same, and thus providing no angular deflection. The coupling of the invention has utility with direct drive (in-line) motors not calling for angular deflection as well as for positive displacement mud motors and other type motors requiring angular deflection. The slanted side 30 in this example has an arc of 60 degrees as measured between points 86 and 87. Effectively, FIG. 27 shows the two teeth 16 on one hub of this example, as their pattern appears in two dimensions. The pattern could be wrapped around the cylinder comprising the hub for cutting of the teeth for a three dimensional presentation.

In three dimensions, the teeth 16 give a "lobe" type appearance, as shown in FIGS. 5-9, 14-17, and 23. FIGS. 14-17 each show one tooth 16, cut away from hub 12 for demonstration. The back or outer surface 26 of the teeth 16 is preferably continuous from the outer surface 21 of hub 12, as shown in FIGS. 5-9. The curved side 32 of tooth 16 is the driver or driven surface and the curve provides a larger radius for enhanced fatigue resistance of the tooth 16. In referring to FIG. 26, the curved side 32 of teeth 16 on one hub of the coupling is called the driver surface and the curved side 32 of tooth 16 on the mating tooth on the other hub of the coupling is called the driven surface. As noted above, the slanted side 30 is the back side and unloaded surface of the tooth 16 (on both hubs comprising the coupling). In operation of the coupling, the curved sides 32 make contact in a clockwise rotation of the coupling whereas the slanted sides 30 do not touch. (Counterclockwise rotation would be likewise with the curved sides on the opposite side of the teeth—that is, with a mirror image version of the teeth and hubs). The contact that the curved sides 32 make is theoretically a "moving line" contact, thereby reducing bearing stresses and improving wear resistance, rather than a "point" contact which is problematic with prior art couplings. The varying radius of each of the teeth 16 is illustrated in FIG. 9 and FIGS. 11-13, which show the cross-sectional area and variance of radius along the length of the tooth 16 at three locations.

There are two particularly notable radiuses on each of the teeth 16. Of these, the more critical one is at base 17 of the teeth where the teeth protrude from hub 12, shown at line 11 in FIG. 9 and in cross-section at FIG. 11. This radius is the larger radius of the teeth 16, for fatigue resistance. The other particularly notable radius is near the top 19 of the teeth 16. This radius is shown at line 13 in FIG. 9 and in cross-section at FIG. 13. Each (or both) of the teeth 16 on hub 12 can have the same radius at these respective locations as the tooth measured and shown in FIGS. 9, 11, 12, and 13, but the radiuses do not have to be the same, or match, from tooth to tooth.

There is a radius difference between the two mating hubs between the top 19 of the teeth 16 on the hub 12 and the base 17 of the teeth 16 on the mating hub 12. In a non-limiting example of an embodiment of the invention, the radius at the top of the teeth 16 is 0.775 inch and the radius at the base 17 is 0.975 inch so the radius difference is 0.200 inch, an arbitrary value, reflecting the difference in radius dimensions. This difference in the radiuses allows for angular deflection, which provides clearance for movement, pivoting, and misalignment of the hubs and their adjoining shafts. During operation even with or in lubricant such as drilling fluid, this difference in radiuses will get smaller, due to wear on all components of the coupling 10. However, the difference in radiuses should still remain sufficient to allow for full deflection during normal operation. The amount of radius difference can vary from coupling to coupling but should be sufficient to allow for angular deflection sufficient for a steerable hole mud motor but not so great as to prevent the coupling from transmitting torque, speed and hydraulic thrust from the power section 52 of the mud motor 50 to the bearing assembly 54, as shown in the schematic in FIG. 2. In the oil and gas industry, about 6 degrees of angular deflection can be desired. In one embodiment where the outside diameter of the hub 12 is from about 2 inches to about 8 inches, and the length of the teeth 16 protruding from the hub 12 is respectively about 0.4 to 2 inches to about 1.6 to 8 inches, the radius difference is preferably about 0.2 inch, when the coupling 10 is not in use (and as explained above will be less when the coupling is in use). This arrangement enables the coupling 10 and the mud motor 50 to also have a steerable motor bend angle, which for this embodiment is a maximum angle of approximately, but not limited to, about 5 degrees.

On the back (or interior) side of the teeth 16, there is an arbitrary gap of about 0.500 at the back or slanted side 30 of the teeth to allow clearance for the teeth 16 during any misalignment of the mated hubs 12. In the example embodiment illustrated in the figures, the gap is 0.500 inch, which is also an arbitrary value. There is also an arbitrary axial gap between mating teeth 16 on the mated hubs 12, and in this example embodiment illustrated in the figures, that gap is 0.40 inch. This axial gap, which may also be called a clearance, allows for downhole wear that occurs during normal drilling operations. This clearance will get smaller over use over time as all involved parts wear.

Figure 29:
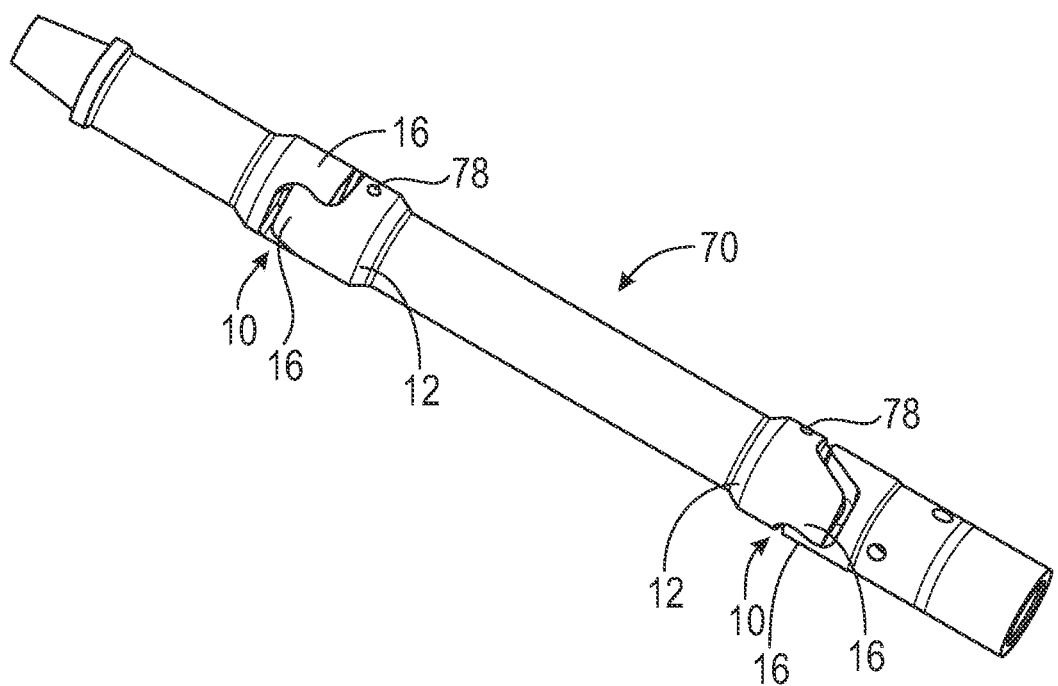
FIG. 29 is a completed assembly of the transmission of FIG. 28, showing the teeth of the couplings engaged for use.

When in use, the curved surfaces 32 of the teeth 16 on the mated hubs 12 will be in contact and on a slight angle, approximately about 3 degrees, rather than "centered" to each other as may appear to be shown in some of the figures herein for illustration of the "mating" of the hubs 12, such as, for example, FIG. 4. That is, when coupling 10 of the invention is in operation, the hub 12 closest to the driver member 11 of the coupling 10 will be touching the hub 12 closest to the driven member 15 of the coupling 10, as shown in FIG. 29.

In the hub 12 of the embodiment of coupling 10 shown in FIGS. 5-17, the teeth 16 extend from hub 12 at base 17 about a central core 38 in hub 12, and thus the teeth also have a curve 28 at base 17 for fitting about the core 38. Core 38 is for receiving a shaft to facilitate mating of a pair of hubs 12 to comprise the coupling 10 for use but in some alternative embodiments hub 16 can be solid with the pair of hubs 12 held together to comprise the coupling by external means. Core 38 also facilitates transmission of hydraulic thrust from the power section of the mud motor 50 through coupling 10 to the bearing assembly 54.

For the embodiment of the coupling 10 of the invention used in a mud motor 50 as shown in FIG. 1, hub 12 is cylindrical in shape. However, hub 12 could have other shapes, such as for non-limiting example, rectangular or square, oval, pentagonal, octagonal, etc. With such alternative shapes, the outer side 26 of the teeth 16 would similarly be altered, being preferably cut from the same block comprising the hub 12.

Although the embodiment of the invention shown in the Figures for illustrating the coupling of the invention shows two teeth on each hub, as discussed above, other numbers of teeth could be used, particularly one tooth or three or four teeth per hub. One of ordinary skill in the art would readily appreciate from the teachings herein how to adapt the hub of the coupling from having two teeth to having only one tooth or having three or four teeth.

The coupling of the invention can have various configurations for fitting with or into different kinds of assemblies. Adaptation of the coupling of the invention to accommodate such different assemblies without changing the basic design, concept, and principles of the invention providing the advantages of the invention will be appreciated by those of ordinary skill in the art from the disclosure and teachings herein. Without limitation, one such example configuration provides a double coupling of the invention with an integral center shaft. Another non-limiting example provides a double coupling of the invention with a separate center shaft. A third non-limiting example provides a single coupling of the invention having either a lip-hole or downhole side, with an integral center "flex shaft."

The coupling of the invention has utility in many different kinds of assemblies and there are many methods for putting those assemblies together. Those of ordinary skill in the art will know from the disclosure and teachings herein how to include and use the coupling of the invention in those many different assemblies. As noted in the discussion above, the coupling of the invention can have a hollow core and be held together in a wide variety of ways "internally," or the coupling can be solid and held together "externally," again in a variety of ways. The particular method can vary with what is needed for the application and with what is common for using couplings in the particular industry.

Figure 28:
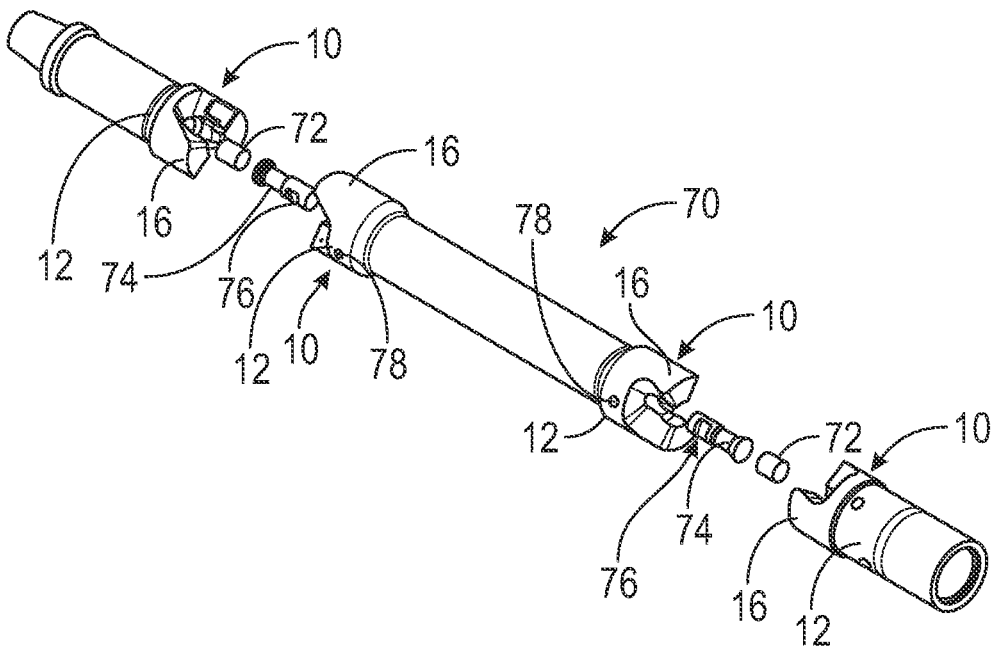
FIG. 28 is a blown apart assembly of a transmission for a mud motor using double couplings of the invention, aligned and joined with a rod and screws fitted in the screw hole or core of the couplings.

For nonlimiting example, one embodiment of the coupling 10 of the invention is shown assembled for use as a transmission 70 in a positive downhole displacement mud motor for downhole directional drilling of a subterranean formation for recovery of oil and gas in FIGS. 28 and 29. This transmission 70 was assembled using one of a number of known assembly methods used in the oil and gas industry. This assembled transmission 70 has double couplings 10 of the invention each assembled together with two internal parts, a seat 72 and a catch 74, that fit in core 38 of each coupling 10, and that transfer the hydraulic thrust created by the Power Section 52 (or axial downward force) and allow each coupling 10 to pivot as a joint while keeping the two mating sets of teeth 16 engaged. Each catch 74 has an alignment point or "flat" 76 for aligning with the threaded hole 78. The configuration is secured with placement of screws (not shown) in the threaded hole 78. Additional securing screws or pins can also be used. Each catch 74 has an alignment point 76 for aligning with the threaded hole 78.

The coupling of the invention can be comprised of any materials commonly used, recognized or accepted for use for couplings in the applicable industry, from any number of metals, metal alloys to plastics. For use in drilling in subterranean formations, the couplings of the invention can be made of metals and metal alloys commonly used in downhole couplings, including without limitation, steel alloys and stainless steel. Further, the coupling of the invention can be made of one or more materials such as a metal or metal alloy or even a plastic and then be coated in whole or at least in part, such as on the curved surfaces of the driver/driven side of the teeth, with a hard metal such as tungsten carbide, for example, to enhance the wear resistance of those surfaces. Alternatively, part or all of the coupling can be subjected to heat treatment or other treatments to enhance the performance of the coupling, such as oxy-acetylene treatment and HVOF treatment. The coupling of the invention can be made a variety of ways, such as, for example, by forging or casting or three-dimensional printing, and with certain plastics by extrusion, and can be made in one or multiple parts. The coupling of the invention can be lubricated with "mud" as typical in downhole mud motor applications, or can be sealed in bellows or an elastomeric sleeve or boot filled with a lubricant, which is typically grease or oil.

While preferred embodiments of the present invention have been described, it should be understood that other various changes, adaptations and modifications can be made therein without departing from the spirit of the invention and the scope of the appended claims. The scope of the present invention should, therefore, be determined not with reference to the above description, but instead should be determined with reference to the appended claims along with their full scope of equivalents. Furthermore, it should be understood that the appended claims do not necessarily comprise the broadest scope of the invention that the applicant is entitled to claim, or the only manner(s) in which the invention may be claimed.

APPENDIX—LIST OF ELEMENTS 10 coupling of the invention
11 driver member of coupling of the invention (hub closer to or adjacent the power section of the mud motor)
12 hub
15 driven member of coupling of the invention (hub closer to or adjacent to the bearing assembly section of the mud motor)
16 tooth or teeth
17 base of tooth or teeth
19 top of tooth or teeth
21 base of hub 12
26 back of outer surface of teeth 16
28 curved interior of tooth adjacent core 38
30 slanted side/back side of tooth or teeth and unloaded surface
32 curved side of tooth or teeth and driver/driven surface
34 maximum stress location on teeth near location of critical radius for fatigue resistance
38 core
43 maximum stress point of tooth of prior art knuckle style joint
45 prior art knuckle style coupling
46 prior art radius at maximum stress point
50 mud motor 50
52 power section of mud motor
54 bearing assembly
56 lower end of bearing assembly (or drive shaft bottom end)
58 drill bit
60 directional wellbore (or borehole)
62 drill string
65 curved section of directional wellbore
70 one embodiment of assembly of transmission of mud motor employing double couplings
72 seat
74 catch
76 alignment point
78 threaded hole or threaded screw hole
80 subterranean formation
81 measurement of hub circumference of one tooth protruding from the hub, including space between teeth on one side of the tooth protruding from the top of the hub
82 measurement of perimeter space between teeth
83 measurement of total hub circumference
84 tip radius or the convex top radius of tooth
85 base radius or the concave base radius of tooth
86 top of slanted side/back side of tooth
87 base of slanted side/back side of tooth
88 measurement of length (or height of tooth from top of hub)
100 drilling rig

What is claimed is:

1. A coupling apparatus for use in effecting transmission of torque, speed, and hydraulic thrust from a power section of a motor to a drive shaft or output shaft, said coupling comprising a pair of mated coupling elements, each having a driver side and an unloaded surface, wherein each said coupling element comprises:
   a hub having a top end and a bottom end;
   one to four teeth protruding cantilevered from the top of the hub and each of said teeth being broader or wider at the tooth base adjacent the hub than at the top of the teeth, thereby enhancing the strength of said teeth over regular shaped teeth while still allowing for mating;
   wherein each of the teeth is irregular in shape but substantially similar one to the other for mating of the hubs to comprise the coupling, and
   wherein each of said teeth have an "S" curved side at the driver side of the coupling and a slanted back side at the unloaded surface of the coupling, such that the maximum stress on the coupling during use occurs at or near the base of the teeth, and
   wherein the coupling has improved torsional strength, fatigue strength and wear resistance over couplings with regular shaped teeth.

2. The coupling of claim 1 wherein each hub has two teeth and each of the teeth has a cross-sectional area at its base that exceeds 100 degrees.

3. The coupling of claim 1 wherein the base of each tooth has a greater diameter or radius and covers more surface area than the top of the tooth.

4. The coupling of claim 1 wherein the slanted back side of each tooth has a backward inclined angle of about 10 degrees to about 60 degrees and tapers from the base of the tooth to the top of the tooth.

5. The coupling of claim 1 wherein on each hub the height of the teeth is in the range of about 0.2× to 1.0× "OD," or about 0.2 times the outside diameter of the hub to about the same value as the outside diameter of the hub.

6. The coupling of claim 1 wherein when the hubs are mated to comprise the coupling, the teeth have a convex top radius different from their concave base radius and the coupling has an angular deflection of at least 6 degrees.

7. The coupling of claim 1 wherein when the hubs are mated to comprise the coupling, the teeth have a convex top radius the same as their concave base radius and the coupling has no angular deflection.

8. The coupling of claim 1 wherein the teeth and the hubs of the pair comprising the coupling are identical.

9. The coupling of claim 1 wherein the coupling provides the transmission in a mud motor used in drilling in a subterranean formation.

10. The coupling of claim 9 wherein the mud motor is used in directional drilling for the recovery of hydrocarbons.

11. A transmission in a mud motor for transmitting torque, speed, and hydraulic thrust from the power section of the motor to a drive shaft or output shaft, the transmission comprising a pair of couplings of claim 1, each assembled with a seat and a catch that transfer axial load and allow each said coupling to pivot as a joint while keeping the coupling engaged.

* * * * *